US007336625B2

(12) United States Patent
Hertel et al.

(10) Patent No.: US 7,336,625 B2
(45) Date of Patent: Feb. 26, 2008

(54) METHOD AND SYSTEM FOR TRANSMITTING DATA VIA A RADIO INTERFACE

(75) Inventors: Rolf Hertel, Grafrath (DE); Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 896 days.

(21) Appl. No.: 10/410,901

(22) Filed: Apr. 10, 2003

(65) Prior Publication Data

US 2003/0176185 A1 Sep. 18, 2003

Related U.S. Application Data

(63) Continuation of application No. PCT/DE01/03722, filed on Sep. 25, 2001.

(30) Foreign Application Priority Data

Oct. 10, 2000 (DE) .............................. 100 50 042

(51) Int. Cl.
*H04B 7/212* (2006.01)
*H04B 1/00* (2006.01)
*H04J 3/00* (2006.01)
*H04M 11/00* (2006.01)

(52) U.S. Cl. ..................... 370/280; 370/493; 370/337; 379/93.06; 379/93.15; 375/132

(58) Field of Classification Search ............... 370/276, 370/278, 280, 282, 294, 337, 347, 458, 328, 370/201, 493; 455/422, 426; 375/132, 130; 379/93.06, 93.01

See application file for complete search history.

(56) References Cited

U.S. PATENT DOCUMENTS

| 5,862,474 | A | | 1/1999 | Kimball |
| 5,909,432 | A | * | 6/1999 | Arends et al. .............. 370/261 |
| 6,026,084 | A | * | 2/2000 | Fukuda ....................... 370/347 |
| 6,047,177 | A | * | 4/2000 | Wickman ................. 455/422.1 |
| 6,411,611 | B1 | * | 6/2002 | van der Tuijn ............. 370/337 |
| 6,434,183 | B1 | * | 8/2002 | Kockmann et al. ......... 375/132 |
| 6,445,921 | B1 | * | 9/2002 | Bell ........................ 455/426.1 |
| 6,958,987 | B1 | * | 10/2005 | Herring et al. ............. 370/338 |

FOREIGN PATENT DOCUMENTS

WO 98/52368 11/1998

* cited by examiner

*Primary Examiner*—Hanh Nguyen
(74) *Attorney, Agent, or Firm*—Laurence A. Greenberg; Werner H. Stemer; Ralph E. Locher

(57) ABSTRACT

Transmission data are transmitted via a radio interface between an analog telephone link and a user apparatus. A base station for a cordless telephone that is connected to the telephone link has a converter that converts the analog signals into digital signals and vice versa. The digital signals are transmitted, in particular according to the DECT standard, via a radio interface between the base station and a mobile station. In the mobile station, the digital signals are decoded, and thus the transmission data are acquired, and vice versa.

10 Claims, 1 Drawing Sheet

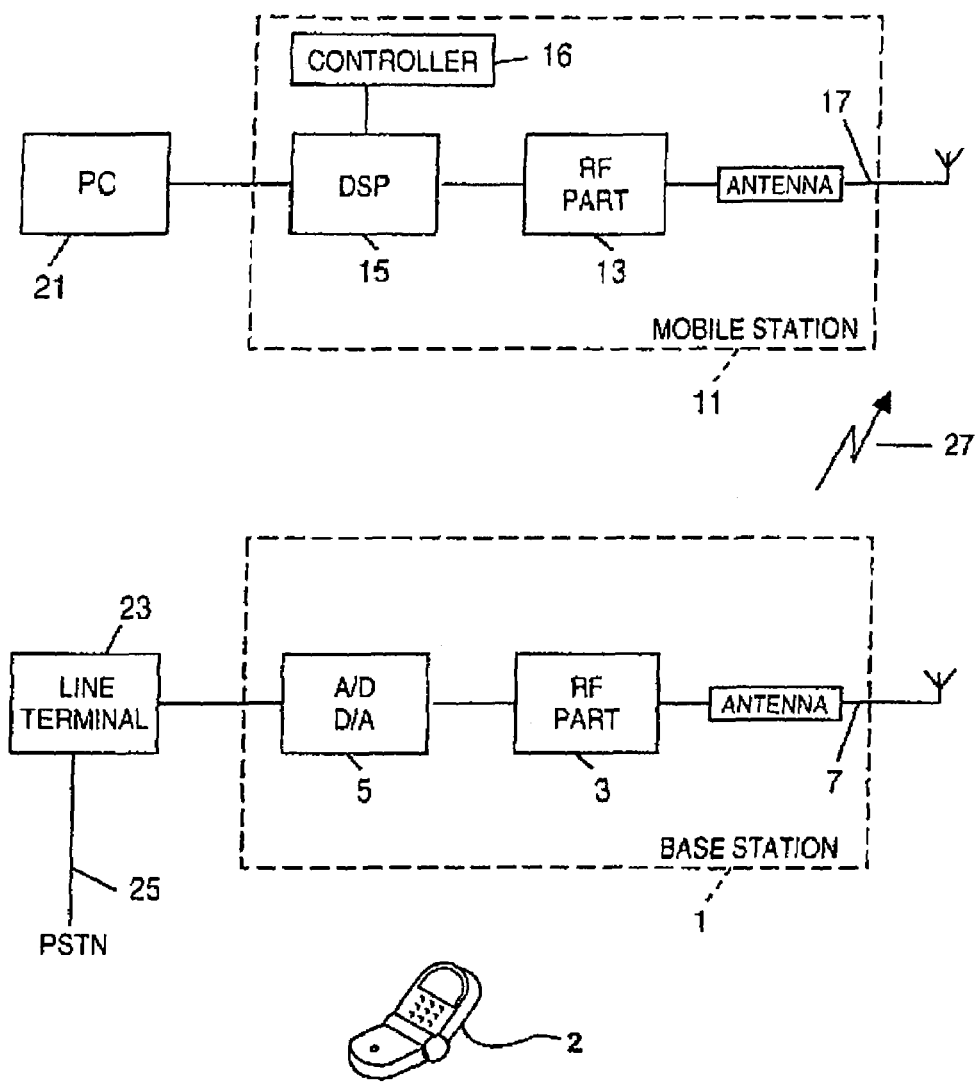

METHOD AND SYSTEM FOR TRANSMITTING DATA VIA A RADIO INTERFACE

CROSS-REFERENCE TO RELATED APPLICATION

This application is a continuation of copending International Application No. PCT/DE01/03722, filed Sep. 25, 2001, which designated the United States and which was not published in English.

BACKGROUND OF THE INVENTION

Field of the Invention

The invention relates to a method, a system and a device for transmitting transmission data via a radio interface between an analog telephone link and a data-processing user apparatus, in particular between a public telephone network and a personal computer (PC). The invention also relates to the implementation of a device for converting analog signals of an analog telephone link into digital signals, and/or vice versa.

An application which is in great demand is the cordless transmission of transmission data which are to be received from an analog telephone link and/or are to be transmitted via such a link. In living rooms or office spaces there is frequently a terminal for a public telephone network which is configured to transmit telephone signals with, for example, a frequency of between 300 Hz and 3400 Hz. So-called modems (modulator/demodulator) are generally used in order to enable data of a data-processing user apparatus, in particular of a PC, also to be transmitted via the public telephone network. A modem adds to the transmission data control information for controlling the transmission and converts the digital signals which are produced in this way into analog signals which can be transmitted via the analog telephone link. In the receiving direction, that is, in the downlink direction, the modem receives analog signals from the telephone link, converts them into digital signals, interprets the digital signals and thus obtains the transmission data.

Numerous different methods exist for converting the transmission data into the analog signals. Many of these methods are standardized in accordance with the Recommendations of the ITU-T. In the simplest case, only the start and the end of a data transmission are signaled by the control information. However, in modern methods with high transmission rates, the transmission data are also compressed and confirmation messages and fault messages are transmitted as control information. Overall, and without being restricted to particular examples of these methods, the preparation of the transmission data for converting the digital signals into analog signals will be referred to below as encoding and the acquisition of transmission data from the digital signals will be referred to as decoding.

At present, cordless telephones, i.e. telephones that do not require a continuous line connection between the receiver or microphone and the network terminal, are widespread. The advantages are obvious: the party to a call can move largely freely during the call. However, cordless links to an analog telephone link are also desirable for data-processing user apparatuses, which, in this context, also include apparatuses that exclusively store data. In particular, the location of the user apparatus can therefore be changed without using disruptive mobile line connections or having to lay new line connections.

In order to be able to transmit data from or to the user apparatus via an air interface, it is known to disconnect a line connection for transmitting the data to or from a modem and to use a transceiver apparatus for the radio transmission of data signals. The transceiver apparatus has a transceiver at each end of the radio interface. Such a transceiver apparatus is, for example, the Gigaset M101 from Siemens Corporation. This solution provides the desired convenience of a cordless transmission to and from the modem, but, as described, requires at least two radio devices. Furthermore, such solutions must be considered either specially or exclusively for a specific data transmission rate or designed for adaptation to data transmissions of different speeds. Since modern modems are capable of changing the transmission speed during the transmission of data, an efficient transceiver apparatus of this type is relatively complex in its method of operation.

Furthermore, it has been proposed to integrate a modem into a conventional base station of a radio telephone. Here too, the modem is located on the opposite side of the radio interface from the data-processing user apparatus. The radio device that is located on the same side as the modem must therefore also be able to carry out relatively complex functions in order to be able to adapt to different data transmission rates.

It has also become known to arrange the modem on the same side of the radio interface as the data-processing user apparatus. Analog signals coming from an analog telephone link are thereby firstly converted into digital signals, the digital signals are transmitted via the radio interface, then converted back into analog signals and fed to the modem. If an ADPCM (Adaptive Difference Pulse Code Modulation) method is used here, the data processing rate is restricted to a maximum of 9600 bit/s. In the case of a PCM (Pulse Code Modulation), in which the radio transmission takes place with a bit rate of 64 kbit/s, the actual data rate is restricted to a maximum of 28.8 kbit/s. However, even this data rate is not sufficient in known embodiments as at first a digital/analog conversion and then an analog/digital conversion of the signals are carried out one after the other on the radio-interface side of the modem in the direction of flow of the signals, combined with conversion of the signals from four-conductor routing to two-conductor and again to four-conductor routing. The conversion restricts the data rate. In addition, a correspondingly large number of converters which are specially configured for this radio transmission of data are necessary.

International PCT publication WO 98/52368 describes a system composed of a data-processing terminating unit, a modem and an analog telephone link, which system has a radio interface. The converter is located here in a modem which is arranged in a central base station controller. The converter is used both in the reception direction and in the transmission direction only if fax signals have to be converted.

U.S. Pat. No. 5,862,474 describes a system composed of a computer, a modem, a radio interface and a base station which is connected to an analog telephone network. The document does not contain any information relating to the design of the base station.

SUMMARY OF THE INVENTION

It is accordingly an object of the invention to provide a method, a system, and a device for transmitting data through a radio interface, which overcomes the above-mentioned disadvantages of the heretofore-known devices and methods of this general type and which permits a radio transmission of the transmission data that is efficient and can be adapted to different data rates and to different transmission standards. At the same time, an embodiment of the method and embodiments of the system are to require, or entail, as little additional expenditure in terms of development as possible.

With the foregoing and other objects in view there is provided, in accordance with the invention, a method for transmitting transmission data between an analog telephone link and a data-processing user apparatus, such as a PC, wherein a cordless telephone base station is connected to the telephone link, a mobile station is coupled to the data-processing user apparatus, and the base station and the mobile station communicate via a radio interface for a cordless telephone. The method comprises the following steps:

for data transmission in a downlink direction,
 receiving analog signals with the transmission data from the analog telephone link;
 converting the analog signals into digital signals with a converter provided in the base station for converting telephone signals for transmission via the radio interface to the cordless telephone;
 transmitting the digital signals via the radio interface; and
 decoding the digital signals with a signal processor in the mobile station, to acquire the transmission data; and
for data transmission in an uplink direction,
 generating encoded digital signals with the signal processor;
 transmitting the digital signals via the radio interface;
 converting the digital signals into analog signals with the converter; and
 outputting the analog signals to the analog telephone link.

There is also provided a transmission method that utilizes a base station of a cordless telephone. The method comprises the following steps:

providing a base station of a cordless telephone apparatus and a radio interface configured to transmit telephone signals between the base station and a cordless telephone;
selectively converting analog signals of an analog telephone link into digital signals and converting digital signals into analog signals for the telephone link, the signals containing transmission data for or from a data-processing user apparatus; and
transmitting the digital signals via the radio interface in a direction toward the data-processing user apparatus or in a direction away from the data-processing user apparatus.

In the method according to the invention, analog signals which correspond to the transmission data are received from the analog telephone link (reception direction), converted into digital signals and the transmission data are obtained by decoding the signals.

In addition, corresponding encoded digital signals are generated from the transmission data, and the digital signals are converted into analog signals and output to the analog telephone link (transmission direction). It is an important consideration that, in order to convert the analog signals into the digital signals and vice versa, a converter which can also be used for converting telephone signals is used in a base station for a radio telephone, and that the digital signals are transmitted via the radio interface and the decoding and encoding is performed on the other side of the radio interface from the base station. In contrast to previously known solutions, there is no need for a classic modem which is either arranged on one or other side of the radio interface. Instead, the corresponding functions are carried out on both sides of the radio interface. This permits, on the one hand, an efficient transmission of the data as digital signals can be transmitted via the radio interface without the need for additional A/D conversions. Since the decoding and encoding of the digital signals takes place on the terminal side of the radio interface, there is no need for particular measures which adapt the radio transmission to changing transmission rates of the transmission data. The radio transmission only has to be capable of functioning at the maximum possible transmission rate. In particular, it is possible to dispense with previously known methods for radio transmission such as the aforesaid ADPCM or PCM methods. A further significant advantage of the invention is that the converter of a conventional base station for a cordless telephone is used. As a result, when such a base station is present, all that is then necessary is to provide the opposite side of the radio interface from the base station. It is even possible to use base stations of cordless telephones without any change or adaptation. However, it is preferred to equip base stations or change them in such a way that present peak values of data transmission rates can be achieved.

For example in DECT systems, the converters of the base stations are at least capable of sampling at a sample rate of 8 kHz the signals which are received from the analog telephone link and converting them into digital signals with, for example, at a resolution of 15 or 16 bits. It is preferred to perform the sampling with a sampling rate of more than 8 kHz, in particular approximately 16 kHz. Some commercially available devices are already capable of doing this. Such high sampling rates make it possible to implement transmission rates which correspond to contemporary modern modem methods, for example of the ITU-T Recommendation V.90.

One development of the method according to the invention relates to the radio transmission of the digital signals according to the TDMA duplex method. It is proposed to use more time slots of a TDMA frame for the radio transmission of the signals in one direction than in the opposite direction. This makes it possible to load the radio system only to the extent that is absolutely necessary, if, as is the case in some modem transmission standards, higher transmission rates are reached in one direction than in the opposite direction.

A further refinement of the invention also relates to TDMA duplex methods. Here, successive time slots and/or groups of time slots of a TDMA frame are alternately used for the radio transmission of the signals in one direction and of the signals in the opposite direction. If the time slots for one direction and for the opposite direction change more frequently than once in the TDMA frame, the dead times during which no data transmission takes place in one particular direction are reduced. The signal processing units on each side of the radio interface can thus operate more continuously and effectively.

Another development of the method relates to the radio transmission of the digital signals according to the DECT (Digital Enhanced Cordless Telecommunication) standard. Here, at least some of the time slots are combined to form one or more groups of successive time slots. This makes it possible to reduce the proportion of control information for controlling the DECT radio transmission per time slot.

With the above and other objects in view there is also provided, in accordance with the invention, a system for transmitting transmission data between an analog telephone link and a data-processing user apparatus. The system comprises:

a cordless telephone base station connected to the telephone link;

a mobile station connected to the user apparatus;

a radio interface for wirelessly connecting the base station with a cordless telephone and connecting the base station with the mobile station;

the base station having a first part of a transceiver apparatus for radio transmission via the interface and a converter for converting analog signals with transmission data that are received from the analog telephone link into digital signals, and for converting digital signals with transmission data into analog signals for outputting to the telephone link, the converter being configured to also convert telephone signals for transmission via the radio interface to the cordless telephone; and the mobile station having a second part of the transceiver apparatus and a signal processor connected to the second part of the transceiver apparatus, the signal processor generating the digital signals from the transmission data and acquiring the transmission data from the digital signals.

In other words, the system according to the invention for transmitting transmission data via an interface of the type mentioned at the beginning has a converter for converting analog signals which correspond to the transmission rates into digital signals and for converting digital signals which correspond to the transmission data into analog signals which are output to the telephone link. Furthermore, a signal processor is present for generating the digital signals from the transmission data and for acquiring the transmission data from the digital signals. In addition, the system has a transceiver apparatus for the radio transmission via the radio interface. According to one important consideration of the invention, the converter is part of a base station for a cordless telephone and is also used for converting telephone signals, the base station has a first part of the transceiver apparatus and a second part of the transceiver apparatus which is connected to the signal processor in order to transmit the digital signals is arranged on the other side of the radio interface.

An apparatus for transmitting transmission data of the type mentioned at the beginning has a signal processor for generating digital signals from the transmission data and for acquiring the transmission data from digital signals, and also has a control apparatus for controlling the operation of the signal processor. A terminal for receiving and outputting the digital signals is provided, the digital signals having control information for controlling a radio transmission of the digital signals via the radio interface. The control apparatus controls the signal processor in such a way that the digital signals also contain control information for controlling a transmission of the transmission data which is contained in the digital signals and is in the form of analog signals, via the analog telephone link (transmission direction, uplink), and such control information in the received digital signals is evaluated and the transmission data are acquired (reception direction, downlink).

Here, the signal processor has a unit in which both the control information for controlling the radio transmission and the control information for controlling the transmission via the analog telephone link is added or evaluated. For example, a modern digital signal processor (DSP) is capable of performing both functions for the reception direction and/or transmission direction. In this way, development and hardware costs can be saved.

Other features which are considered as characteristic for the invention are set forth in the appended claims.

Although the invention is illustrated and described herein as embodied in a data transmission via a radio interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic block diagram showing an exemplary embodiment of a system for transmitting transmission data via a radio interface; the system is connected, on one side of the radio interface, to a public telephone network and, on the other side of the radio interface, to a PC.

DESCRIPTION OF THE PREFERRED EMBODIMENTS

Referring now to the sole FIGURE of the drawing in detail, it should first be noted that the illustration is but schematic and shows only components which are significant for the invention. Further components and functions may be provided, as understood by those of skill in the pertinent art.

There is shown, in the FIGURE, a telephone link 25 to a public telephone network, which telephone link 25 is implemented, for example, by means of a two-conductor fixed line. A base station 1 is connected to a line terminating unit 23. The base station 1 has a converter 5 for converting the analog signals received by the public telephone network into digital signals. In addition, the converter 5 serves the purpose of converting digital signals into analog signals which are output to the public telephone network via the line terminating unit 23. The converter 5 is in particular a σ-δ converter which is capable of sampling analog signals in the reception direction with a sampling frequency of 16 kHz with a resolution of 15 or 16 bits. This means a data rate of 240 or 256 kbit/s of the resulting digital signals for the reception direction.

The base station 1 also has a radio-frequency part (RF part) 3 by which the digital signals received from the converter 5 are converted from the base band into a radio-frequency signal and output to the antenna apparatus 7 of the base station 1. Furthermore, the RF part 3 receives radio-frequency signals from the antenna apparatus 7 and converts them into the base band.

The antenna apparatus 7 defines one side of a radio interface 27 via which radio-frequency signals can be transmitted to an antenna apparatus 17 and radio-frequency signals can be received from it. The antenna apparatus 17 is a component of a mobile station 11 in which the radio-frequency signals are further processed. The mobile station 11 does not need to be mobile at all times but rather can for example also be installed in a fixed fashion. However, it is mobile to the extent that it can be moved at least once to virtually any desired location in the transmission range of the base station 1. However, the mobile station 11 is preferably a compact mobile device which can be connected to a data-processing user apparatus via, for example, a data line that is operated according to the V.24 standard or via a USB interface. In the exemplary embodiment in the figure, the user apparatus is a personal computer (PC) 21.

The mobile station 11 has a RF part 13 which converts radio-frequency signals into base band signals and vice versa, in a way corresponding to the RF part 3. The RF part 13 is connected to a digital signal processor (DSP) 15 in which the digital signals are processed in the base band and the actual transmission data are acquired from the digital signals. The transmission data are then output to the PC 21. Conversely, the DSP 15 converts transmission data received from the PC 21 into suitable digital signals and then outputs them to the RF part 13.

The mobile station 11 can also be integrated into the PC 21, for example as a plug-in card. In this case, the line connection between the PC 21 and the mobile station 11 constitutes, for example, part of an internal data bus of the PC 21.

Furthermore, the mobile station 11 has a controller 16 which controls the operation of the DSP 15.

The function of the system illustrated in FIG. 1 will now be described below by way of example:

The base station 1 is a base station which operates according to the DECT standard and can also be used for operating a cordless telephone 2. Accordingly, the mobile station 11 is configured to process signals according to the DECT standard. The RF parts 3 and 13 are, for example, so-called slow-hopping RF parts in which, of the respective twelve transmission and reception time slots of a TDMA frame, in each case six are required for the stabilization of synthesizers contained in the RF parts 3, 13. For this reason, in each case only six time slots per TDMA frame are available in the transmission and reception direction.

A data transmission from the PC 21 to a remote data-processing apparatus will now be carried out via the analog telephone link 25. During this link, transmission data are also to be transmitted from the remote apparatus to the PC 21. The controller 16 is capable of controlling the operation of the mobile station 11 in the same way as the controller of a conventional modem which is capable of operating according to the ITU-T Recommendation V.90. If the remote data-processing apparatus is also equipped with a transmission apparatus which operates according to this Recommendation, the controller 16 controls the operation of the DSP 15 in such a way that the digital signals which are output to the RF part are correspondingly compressed and provided with corresponding control information, or that the digital signals received by the RF part 13 are interpreted correctly. In addition, the controller 16 is responsible for controlling additional functions such as, for example, echo compensation and correction of the errors of the transmitting signals. For this purpose, non-illustrated additional components may be provided in the mobile station 11, for example data memories which interact with the DSP 15 and/or the controller 16.

According to the V.90 Recommendation, data transmission rates of the data which are actually to be transmitted of up to 56 kbit/s are achieved in the reception direction, i.e. in the direction from the telephone link 25 toward the DSP 15, and in contrast only significantly lower data rates are achieved in the transmitting direction. The corresponding data rate for the digital signals transmitted between the DSP 15 and the converter 5 is 240 kbit/s in the reception direction and 120 kbit/s in the transmission direction. This data rate is higher than the actual data transmission rate as in the reception direction the digital signals must contain a sufficient amount of sampling information of the analog signals received by the converter 5 and a sufficient amount of information for the converter 5 for the conversion into analog signals must be present in the transmission direction. In addition, on the transmission link between the base station 1 and the mobile station 11 there is also control information for controlling the radio transmission.

In order to be able to transmit the digital signals at 240 kbit/s in the reception direction, the six time slots of a TDMA frame which are available for the reception direction are combined to form three double time slots, each double time slot being composed of two time slots which follow one another directly. Between the double time slots there are sufficient further time slots available for stabilizing the synthesizers. Combining the time slots enables the proportion of DECT control information in every two time slots to be reduced so that a transmission capacity for the transmission of the digital signals of 400 bits in contrast with 320 bits is available for the individual time slot. As the temporal length of a TDMA frame is 10 ms, the desired 240 kbit/s can be transmitted in this way. This means that, given the sampling of the analog signals with a sampling rate of 16 kHz and with a resolution of 15 bits as described above, exactly the entire sampling information which corresponds to the digital signals can be transmitted in the three double time slots per TDMA frame.

The base station therefore does not behave any differently than when normal radio transmissions are made according to the DECT standard, with the exception that the sampling information must be copied into double time slots and the aforesaid high sampling rate must be present. No hardware changes are necessary to devices with a sufficient sampling rate which are already commercially available. The transmission method can be implemented solely by changing the controller of the devices, for example by updating software in the devices.

In the transmission direction, or uplink, the mobile station 11 receives the sampling information which has been transmitted in this way and also the DECT control information contained in the same time slots. The controller 16 and the DSP 15 interact here in such a way that the DSP 15 both processes the DECT control information and acquires the actual transmission data from the sampling information. Conversely, the controller 16 actuates the DSP 15 in the transmission direction in such a way that the DSP 15 converts the actual transmission data into digital signals in accordance with the applied ITU-T Recommendation and also adds the DECT control information. The DSP 15 can perform all these aforesaid tasks, for example, in multitasking mode, by using data memories, for example.

In one advantageous variant of the DECT method, the strict division of a TDMA frame into 12 successive time slots for the reception direction and 12 subsequent successive time slots for the transmission direction is dispensed with. If, for example, at least 240 kbit/s are required for the digital signals, as is the case above for a modem transmission according to the V.90 Recommendation, preferably eight individual time slots are used for the reception direction and four individual time slots for the transmission direction. When apportioning, there are also sufficient time slots available for both directions for stabilizing the synthesizers of slow-hopping RF parts, and it is also possible to dispense with the combination of individual time slots to form groups of successive time slots. The digital signals can even be transmitted with a data rate of 256 kbit/s in the reception direction so that, given a sampling rate of 16 kHz of the converter 5, it is possible to operate with a resolution of 16 bits.

In accordance with a further variant, in particular when using fast-hopping RF parts, time slots for the transmission and reception directions alternate repeatedly within one TDMA frame. This permits a reduction in the dead time, i.e. the time during which no information can be transmitted in one transmission direction as during this time information is transmitted in the other direction (TDMA duplex method). As a result, in particular when faults occur, it is possible to react more quickly and, for example, incorrectly received information can be retransmitted. In particular in modem mode it is thus possible to obtain an overall faster transmission of data and to change more quickly to an appropriate transmission speed of the data.

As the foregoing description shows, the implementation of a data transmission via a radio interface between an analog telephone link and a data-processing user apparatus is particularly cost-effective by way of the invention. At most slight changes have to be made to an existing base station for a cordless telephone. Furthermore, it is possible to mass-produce base stations that are suitable for operating cordless telephones, other cordless communication systems and for the type of radio transmission of data according to the invention. In addition, with modern base stations it is possible to achieve high data transmission rates that correspond to current ITU-T Recommendations.

We claim:

1. A method for transmitting transmission data between an analog telephone link and a data-processing user apparatus, wherein a base station for a cordless telephone is connected to the analog telephone link, a mobile station is coupled to the data-processing user apparatus, and wherein the base station and the mobile station communicate via a radio interface, the method which comprises the following steps:
for a data transmission received in a downlink direction,
receiving analog signals with the transmission data from the analog telephone link;
converting the analog signals into digital signals with a converter provided in the base station for converting telephone signals for transmission via the radio interface to the cordless telephone;
transmitting the digital signals via the radio interface;
decoding the digital signals with a signal processor in the mobile station, to acquire the transmission data in digital form; and
providing the acquired digital transmission data to the data-processing user apparatus; and
for data transmission in an uplink direction,
providing signals from the data-processing user apparatus in digital form;
generating encoded digital signals from the provided digital signals with the signal processor;
transmitting the digital signals via the radio interface;
converting the digital signals into analog signals with the converter; and
outputting the analog signals to the analog telephone link.

2. The method according to claim 1, which comprises transmitting the signals via the radio interface in a TDMA duplex method, and thereby utilizing successive time slots or groups of time slots of a TDMA frame alternately for the radio transmission of the signals in one direction and of the signals in an opposite direction.

3. The method according to claim 1, which comprises radio transmitting the digital signals in accordance with the Digital Enhanced Cordless Telecommunication (DECT) standard, and thereby combining at least some time slots to form one or more groups of successive time slots.

4. A method for transmitting transmission data between an analog telephone link and a data-processing user apparatus, wherein a base station for a cordless telephone is connected to the analog telephone link, a mobile station is coupled to the data-processing user apparatus, and wherein the base station and the mobile station communicate via a radio interface, the method which comprises the following steps:
for a data transmission received in a downlink direction,
receiving analog signals with the transmission data from the analog telephone link;
converting the analog signals into digital signals with a converter provided in the base station for converting telephone signals for transmission via the radio interface to the cordless telephone;
transmitting the digital signals via the radio interface;
decoding the digital signals with a signal processor in the mobile station, to acquire the transmission data in digital form; and
providing the acquired digital transmission data to the data-processing user apparatus; and
for data transmission in an uplink direction,
providing signals from the data-processing user apparatus in digital form;
generating encoded digital signals from the provided digital signals with the signal processor;
transmitting the digital signals via the radio interface;
converting the digital signals into, analog signals with the converter; and
outputting the analog signals to the analog telephone link;
wherein the data-processing user apparatus is a personal computer.

5. A method for transmitting transmission data between an analog telephone link and a data-processing user apparatus, wherein a base station for a cordless telephone is connected to the analog telephone link a mobile station is coupled to the data-processing user apparatus, and wherein the base station and the mobile station communicate via a radio interface, the method which comprises the following steps:
for a data transmission received in a downlink direction,
receiving analog signals with the transmission data from the analog telephone link;
converting the analog signals into digital signals with a converter provided in the base station for converting telephone signals for transmission via the radio interface to the cordless telephone;
transmitting the digital signals via the radio interface;
decoding the digital signals with a signal processor in the mobile station, to acquire the transmission data in digital form; and
providing the acquired digital transmission data to the data-processing user apparatus; and
for data transmission in an uplink direction,
providing signals from the dataprocessing user apparatus in digital form;
generating encoded digital signals from the provided digital signals with the signal processor;
transmitting the digital signals via the radio interface;
converting the digital signals into analog signals with the converter; and
outputting the analog signals to the analog telephone link; and
transmitting the signals via the radio interface in a TDMA duplex method, and thereby utilizing more time slots of a TDMA frame for the radio transmission of the signals in one direction than in an opposite direction.

6. A system for transmitting transmission data between an analog telephone link and a data-processing user apparatus, comprising:
- a cordless telephone base station connected to the telephone link;
- a mobile station connected to the data-processing user apparatus;
- a radio interface for wirelessly connecting said base station with a cordless telephone and connecting said base station with said mobile station;
- said base station having a first part of a transceiver apparatus for radio transmission via said radio interface and a converter for converting analog signals with transmission data that are received from the analog telephone link into digital signals, and for converting digital signals with transmission data into analog signals for outputting to the telephone link, said converter being configured to also convert telephone signals for transmission via said radio interface to the cordless telephone; and
- said mobile station having a second part of said transceiver apparatus and a signal processor connected to said second part of said transceiver apparatus, said signal processor generating the digital signals from the transmission data provided from the data processing user apparatus in digital form and acquiring the digital transmission data from the
- digital signals being provided to the data-processing user apparatus.

7. A system for transmitting transmission data between an analog telephone link and a data-processing user apparatus, comprising:
- a cordless telephone base station connected to the telephone link;
- a mobile station connected to the data-processing user apparatus;
- a radio interface for wirelessly connecting said base station with a cordless telephone and connecting said base station with said mobile station;
- said base station having a first part of a transceiver apparatus for radio transmission via said radio interface and a converter for converting analog signals with transmission data that are received from the analog telephone link into digital signals, and for converting digital signals with transmission data into analog signals for outputting to the telephone link, said converter being configured to also convert telephone signals for transmission via said radio interface to the cordless telephone;
- said mobile station having a second part of said transceiver apparatus and a signal processor connected to said second part of said transceiver apparatus, said signal processor generating the digital signals from the transmission data provided from the data processing user-apparatus in digital form and acquiring the digital transmission data from the digital signals being provided to the data-processing user apparatus; and
- wherein the data-processing user apparatus is a PC.

8. A transmission method, which comprises:
- providing a base station of a cordless telephone apparatus and a radio interface configured to transmit telephone signals between the base station and a cordless telephone;
- selectively converting analog signals of an analog telephone link into digital signals and converting digital signals into analog signals for the telephone link, the analog and digital signals containing transmission data intended for a data-processing user apparatus or received from the data-processing user apparatus; and
- at least one of;
  - decoding the digital signals to acquire the transmission data in digital form and providing the acquired digital transmission data to the data processing user apparatus; and
  - providing signals from the data processing user apparatus in digital form and generating encoded digital signals from the provided digital signals.

9. The method according to claim 8, which comprises converting the analog signals received from the analog telephone link with a converter of the base station, the converter sampling the signals with a sampling rate of more than 8 kHz for conversion into the digital signals.

10. The method according to claim 9, which comprises sampling with a sampling rate of approximately 16 kHz.

* * * * *